(12) United States Patent
Siders et al.

(10) Patent No.: US 7,013,109 B2
(45) Date of Patent: Mar. 14, 2006

(54) ASSESSMENT TOOL FOR TRAINING ANALYSIS

(75) Inventors: Clementina M. Siders, Orlando, FL (US); Douglas J. Samuel, Davenport, FL (US); Timothy C. Whitten, New Smyrna Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 198 days.

(21) Appl. No.: 10/011,230

(22) Filed: Jul. 12, 2002

(65) Prior Publication Data

US 2004/0010439 A1    Jan. 15, 2004

(51) Int. Cl.
*G09B 3/00*    (2006.01)

(52) U.S. Cl. ............... 434/353; 434/118; 434/322; 434/350; 705/10

(58) Field of Classification Search ............... 434/118, 434/322, 350; 705/10, 11
See application file for complete search history.

(56) References Cited

U.S. PATENT DOCUMENTS

| | | | | |
|---|---|---|---|---|
| 5,002,491 A | * | 3/1991 | Abrahamson et al. | ...... 434/322 |
| 5,180,309 A | * | 1/1993 | Egnor | ......... 434/323 |
| 5,616,033 A | * | 4/1997 | Kerwin | ......... 434/118 |
| 6,302,698 B1 | * | 10/2001 | Ziv-El | ......... 434/323 |
| 6,477,504 B1 | * | 11/2002 | Hamlin et al. | .......... 705/10 |
| 6,631,370 B1 | * | 10/2003 | Pekkanen | ........... 707/4 |
| 6,736,642 B1 | * | 5/2004 | Bajer et al. | ......... 434/236 |
| 2002/0120491 A1 | * | 8/2002 | Nelson | .......... 705/10 |
| 2002/0146676 A1 | * | 10/2002 | Reynolds | ......... 434/362 |
| 2004/0009462 A1 | * | 1/2004 | McElwrath | ......... 434/350 |
| 2004/0093257 A1 | * | 5/2004 | Rogers et al. | .......... 705/10 |

* cited by examiner

*Primary Examiner*—Monica S. Carter
*Assistant Examiner*—Cameron Saadat
(74) *Attorney, Agent, or Firm*—Eliot Abolafia

(57) ABSTRACT

An automated interactive form of data collection is disclosed that addresses the deficiencies of the standard method of personal interviews and the typical paper-based and computer-based surveys. Subject Matter Experts (SMEs) can provide data in a faster, more accurate and comprehensive manner, while providing the justification of their responses immediately. Using these data, an instructional analyst can continue the Instructional Systems Design process utilizing SME data that are complete and conclusive, without the need for extensive follow-up questioning. The database files generated by the survey software are available to the analyst for analysis and inclusion in the resulting training system analysis document.

2 Claims, 3 Drawing Sheets

|   | Phase 1 | Phase 2 | Phase 3 | Phase 4 |
|---|---------|---------|---------|---------|
| Step | Analyst | Respondent 1 or Analyst | Respondent 2 through n | Analyst |
| 1 | Set Survey Parameters | Run AMCT survey | Run AMCT survey | Analyzes consensus and discrepant responses |
| 2 | Develop Motivational Information | Answer multiple choice questions | Answer Background Questions | Report Results |
| 3 | Develop Instructions | Baseline created | Answer Multiple Choice Question | |
| 4 | Develop Questions | | Review Logic, Analyzes Response | |
| 5 | Survey constructed | | If not consensus, provide oral justification | |
| 6 | | | Go to next question | |
| 7 | | | Respondent survey stored | |
| 8 | | | Baseline updated (optional) | |

FIG 1

ASSESSMENT TOOL FOR TRAINING ANALYSIS

BACKGROUND OF THE INVENTION

The present invention relates generally to the field of data collection, and more specifically to human responses.

The most common means of data collection are the interview and the questionnaire. In the past, the interview has been the most popular data collection instrument. Recently, the questionnaire has surpassed the interview in popularity, especially in the military. Primarily, the advantage of administering a questionnaire instead of conducting an interview is two-fold, lower cost and the saving of time. Furthermore, not having to conduct interviews eliminates a lengthy and expensive requirement of training the interviewer(s). Also, the time and cost expended when traveling or telephone expenses when not traveling is virtually eliminated.

An additional advantage of a questionnaire is a standardized data-gathering procedure. A well-constructed questionnaire can minimize the effects of potential human errors e.g., altering the pattern of question asking, and biasing by "explaining." The use of a questionnaire also eliminates any bias introduced by feelings of the respondents towards the interviewer or visa versa.

The primary disadvantages of questionnaires are no returns, misinterpretation, and validity. No returns are questionnaires or individual questions that are not answered. The lowered response rate due to "no returns" could introduce a systematic bias into the survey results. Misinterpretation occurs when the respondent does not understand either the survey instructions or the survey questions. When respondents become confused, historically they either do not respond or they answer questions in terms of the way they understand it, not necessarily maintaining the intent of the question. Some view the latter problem as a more dangerous occurrence than merely not responding. The third disadvantage, validity is the inability to check on the soundness of the answer. For example, did the individual respond indiscriminately, or was the response purposely misleading?

The automated AMCT survey will allow the administrator to cost effectively obtain the data needed and simultaneously minimize the chance that one of the many types of biases, previously discussed, will invalidate the survey results.

SUMMARY OF THE INVENTION

The present invention provides an automated fact-finding data collection method implementing consensus review logic. Each respondent's answer is analyzed (compared with baseline response) in real time. If a discrepancy exists, specific feedback is provided to which the respondent must verbally reply. Such tailored feedback minimizes survey bias and justifies response variation.

Research has shown that AMCT computer-based surveys not only capture the justifications for the identified discrepancies, but also provide an interface that significantly reduces many survey biases. The review logic process places, in real time, a value and importance on each of the user's responses, resulting in a reduction of biased responses, such as indiscriminant responses and non-responses. The justifications also provide the analyst with insight as to whether the respondent might have misinterpreted the question.

The present invention incorporates iterative review logic that examines previous responses to a particular question in an attempt to resolve differences. After a response is submitted, the software compares the current answer to those previously submitted. If any previous answers are different from the current response, the user is presented with a screen 1) containing a histogram illustrating the distribution of previous responses and text instructing the user to 2) record comments justifying his/her answer. The recording may be made to contain the comments for storage in WAV audio file format. To save storage space, the WAV file may be recorded at a sample rate of 8 khz, which produces excellent voice quality without excessive storage requirements. A time-stamped file name associated with the WAV file is stored in the database record. After completion of the recording process, the user is presented with the next question in the survey. If a user's response matches all previously entered responses for that question, there are no justification requirements and the next question is presented. This is a linear process unlike consensus techniques that are iterative in nature.

BRIEF DESCRIPTION OF THE DRAWINGS

FIG. 1 shows a table of the AMCT setup and operation.

DESCRIPTION OF A PREFERRED EMBODIMENT

Figure 2:
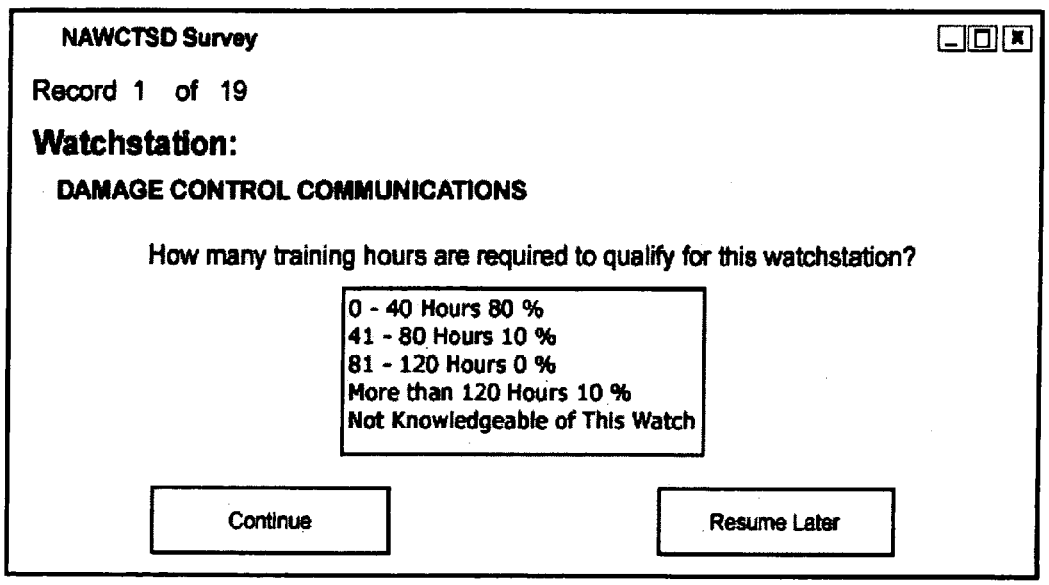
FIG. 2 shows a question response screen.

The present invention is an Advanced Multimedia Consensus Technique (AMCT) that was developed to automate the survey process. It is a computer-based tool, and is comprised of four phases: Preparation, Baseline, Execution, and Evaluation. FIG. 1 shows the AMCT Setup and Operation, and graphically describes the configuration and use of the automated AMCT. The processes of the AMCT are outlined.

Preparation Phase—Phase 1

Preparation phase 10 is similar in many ways to a conventional survey. However, there are some survey parameter variables that are unique to and necessitated by the AMCT.

Survey Parameter

There are three parameters and one set of parameters that the Analyst may set or modify. They include: Tolerance band, Histogram, Baseline, and Consensus Set.

Tolerance Band Parameter

This parameter defines the acceptable deviation from what is determined to be the baseline responses. Responses that fall outside of the band trigger the review logic process. Usually this parameter is set to 1 or 2. If this parameter is set to one, then any response different from the baseline invokes the review logic process.

Histogram Parameter

This parameter provides the analyst with the option of displaying or hiding a histogram illustrating the distribution of previous responses. If enabled, the histogram will be displayed on the justification screen is during the review logic process.

Baseline Parameter

This parameter affects how the survey's baseline is determined. The baseline may be created in three ways. The baseline may be automatically established by the first person taking the survey as shown in Phase 2 of FIG. 1. Or, the Analyst who has prior information may create the baseline. Lastly, this parameter may be set so that the baseline is created by an ongoing process where all previous answers affect the baseline.

Consensus Parameter Set

These parameters should be set when a survey contains both a large number of questions and a large sample size. The software has the functionality to reduce the question pool. That is, based on the commonality of responses, questions are dropped when there is statistical confidence that a consensus has been determined. Consequently, the remaining respondents will not be presented with as many questions and may be able to complete the survey in less time. If an analyst activates this option, the analyst must set a query sample size and a probability and frequency tolerance. A binomial probability distribution function is used to calculate the probability that the current sample forms a consensus.

Motivational Information

This information should be common to any survey instrument. The intent is to motivate the respondent to reply truthfully and quickly. Motivational information includes the survey title, purpose, how they were chosen to participate, impact, sponsorship and a confidentiality clause.

Instructions

The motivational information is followed by a clear set of instructions explaining how to complete a survey and, if applicable, where to return it. Again, this is a common requirement of all survey instruments.

Questions

There are three types of questions implemented in the AMCT survey, background, multiple-choice, and open-ended questions. The background questions are used to obtain the demographic characteristics of the respondents. These questions precede all other questions in the survey. Multiple-choice questions are the primary questions used in the AMCT survey. These questions are used to determine the respondent's opinion on certain issues. Open-ended questions are used when a respondent needs to justify a response. These questions are presented in a "complete the sentence" type format where the respondent may be requested to reply orally. These open-ended questions are automatically generated by the software when required.

Baseline Phase—Phase 2

Baseline phase 12 establishes the baseline responses. Depending upon the parameter set, the answers to the multiple-choice questions are stored in a database for later reference. This baseline will then be used in the review logic process described in detail in the next section, Execution Phase—Phase 3.

Execution Phase—Phase 3

Execution Phase 14 refers to a typical interactive runtime session. This phase does not affect baseline respondent. Once the respondent is presented with the motivational information and survey instructions, the respondent completes the demographics portion of the survey. After the demographic portion is completed, each survey question will be presented. The user will then be required to select a multiple-choice response. FIG. 2 shows how the computer screen may appear.

Figure 3:
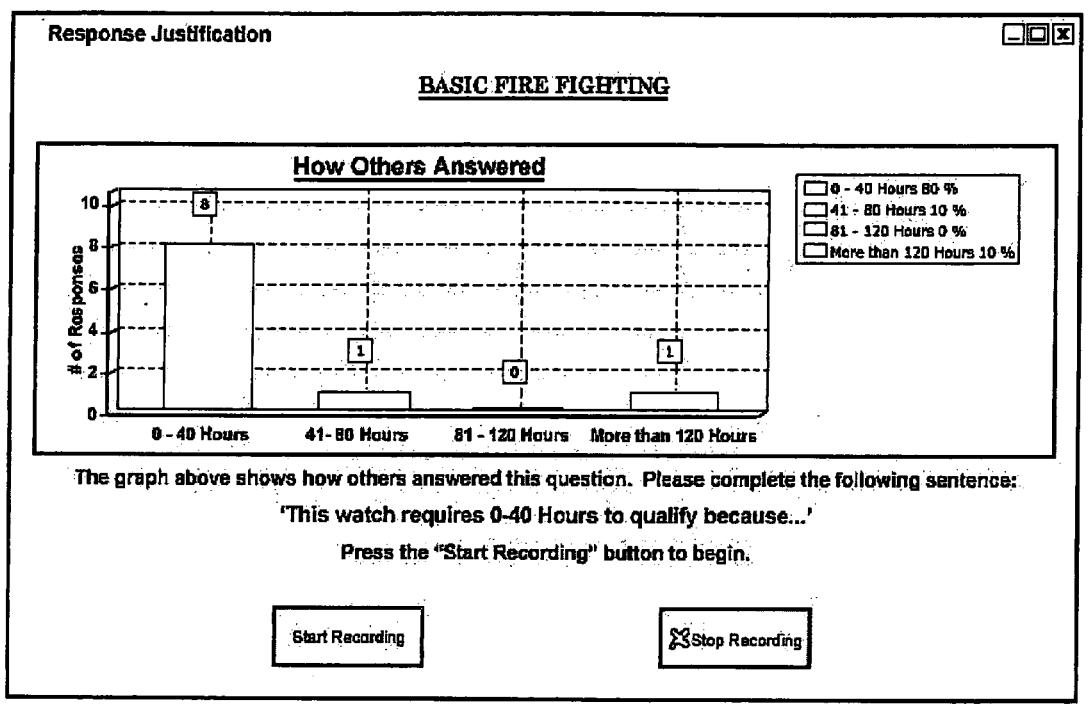
FIG. 3 shows a justification screen.

Once a response is selected, the review logic will determine the next step of the survey process. The survey response is compared with the baseline response. If the response is within the specified tolerance band, the subsequent question in the survey will be presented. However, if the response deviates from the baseline by an amount greater than the tolerance band, the user will be given the opportunity to change the response. Regardless whether the response is changed, the respondent must justify his/her answer. This is done by orally completing the sentence that is presented on the screen. FIG. 3 illustrates a pop-up box with the customized feedback that may appear if a response is outside the tolerance band. The audio justifications will be stored for further analysis. After completion of the recording process, the user is presented with the next question in the survey. This process iterates until the last question is presented. Also included in this phase is a book-marking feature that allows the respondent to exit prior to completion of the survey and then later resume at the point at which they left the survey. To accommodate this option and to maintain anonymity in the survey, the respondent is required to enter a unique identification number that is provided when the bookmark is set.

Evaluation Phase—Phase 4

Evaluation phase 16 is where the survey data is evaluated. That occurs at the completion of any data collection process. However, by using the AMCT to conduct the survey, the analyst will have the justification data for all the discrepant responses without the need for extensive follow-up questioning.

Alternatives

The AMCT may be implemented as a paper-based survey. Although more difficult to administer than a computer-based AMCT survey, many of the same benefits are realized. Moreover, the AMCT Survey Software may be adapted to operate in a distributed environment such as a local network or the internet. This would further decrease the time and cost associated with the administration of a fact-finding survey among a large, geographically distributed sample group. Furthermore by being in a distributive environment, the survey would be more accessible to the respondent. Consequently, the probability of collecting better data would be increased.

What is claimed is:

1. A method for eliminating respondent information bias in a data processing system comprising:
    establishing baseline responses for later reference;
    specifying a tolerance band to the baseline responses;
    presenting to a respondent a first survey question wherein the first survey question comprises two or more multiple-choice responses;
    having the respondent select one response for the first survey question;
    implementing a review logic process by comparing the baseline response to the first survey question response to determine whether a justification will be elicited from the respondent; and,
    eliciting justification for the response to the first survey question from the respondent if the response is not within the tolerance band for eliminating respondent bias, wherein the justification comprises presenting a sentence and, having the respondent complete the sentence.

2. A method for eliminating respondent information bias in a data processing system comprising:
    establishing baseline responses for later reference;
    specifying a tolerance band to the baseline responses;
    presenting to a respondent a first survey question wherein the first survey question comprises two or mare multiple-choice responses;
    having the respondent select one response for the first survey question;
    implementing a review logic process by comparing the baseline response to the first survey question response to determine whether a justification will be elicited from the respondent; and,
    eliciting justification for the response to the first survey question from the respondent if the response is not within the tolerance band for eliminating respondent bias, wherein the justification comprises presenting a sentence and, having the respondent complete the sentence orally.

* * * * *